(12) United States Patent
Gao et al.

(10) Patent No.: US 11,116,085 B2
(45) Date of Patent: Sep. 7, 2021

(54) DISPLAY DEVICE

(71) Applicants: Chengdu BOE Optoelectronics Technology Co., Ltd., Chengdu (CN); BOE Technology Group Co., Ltd., Beijing (CN)

(72) Inventors: Run Gao, Beijing (CN); Ruilin Wang, Beijing (CN); Dingdong Song, Beijing (CN); Mao Li, Beijing (CN); Chao Yin, Beijing (CN); Qi Chen, Beijing (CN); Jia Yuan, Beijing (CN); Dan Liu, Beijing (CN); Xuguang Sun, Beijing (CN); Yu Chen, Beijing (CN); Liushan Chen, Beijing (CN); Bin Hou, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 16/711,880

(22) Filed: Dec. 12, 2019

(65) Prior Publication Data

US 2020/0221586 A1 Jul. 9, 2020

(30) Foreign Application Priority Data

Jan. 3, 2019 (CN) .......................... 201920007901.1

(51) Int. Cl.
*H05K 5/00* (2006.01)
*H02K 7/14* (2006.01)
*G01D 5/20* (2006.01)
*H01F 38/14* (2006.01)

(52) U.S. Cl.
CPC ......... *H05K 5/0017* (2013.01); *G01D 5/2013* (2013.01); *H01F 38/14* (2013.01); *H02K 7/14* (2013.01); *G09G 2380/02* (2013.01)

(58) Field of Classification Search
USPC ........................................................ 361/728
See application file for complete search history.

(56) References Cited

U.S. PATENT DOCUMENTS

| | | | | |
|---|---|---|---|---|
| 10,517,180 | B2 * | 12/2019 | Choi | ..................... H05K 5/0017 |
| 2013/0127799 | A1 * | 5/2013 | Lee | ........................ G06F 1/1652 |
| | | | | 345/204 |
| 2013/0203469 | A1 * | 8/2013 | Cho | .................... G06F 3/04886 |
| | | | | 455/566 |
| 2016/0187929 | A1 * | 6/2016 | Kim | ....................... G06F 1/1601 |
| | | | | 345/184 |
| 2017/0308346 | A1 * | 10/2017 | Lee | ....................... G09G 3/2092 |
| 2017/0357287 | A1 * | 12/2017 | Yang | ..................... G06F 1/1677 |

* cited by examiner

*Primary Examiner* — Hung S. Bui
(74) *Attorney, Agent, or Firm* — Arent Fox LLP; Michael Fainberg (57) ABSTRACT

A display device is disclosed. The display device includes a housing, a display screen, a driving device, and a measuring component, wherein an opening is arranged on the housing, at least a part of the display screen is located in the housing, the display screen is connected with the driving device, the driving device is configured to drive the display screen to extend out of the housing, and/or to retract into the housing through the opening, and the measuring component is configured to measure a length of the display screen extending out of the housing.

19 Claims, 4 Drawing Sheets

DISPLAY DEVICE

CROSS-REFERENCE TO RELATED APPLICATION

This disclosure claims priority to Chinese Patent Application No. 201920007901.1, filed on Jan. 3, 2019, the content of which is incorporated by reference in the entirety.

FIELD

The disclosure relates to the field of display technologies, and particularly to a display device.

DESCRIPTION OF THE RELATED ART

In recent years, the development of the flexible display technology has significantly promoted the evolvement of future display technologies toward more lightweight and diversified display devices. A curly flexible display device including a flexible display screen, which can be curled and stored to thereby save a space as large as possible, and make it convenient for a user to carry, has become one of focuses of the developing future display technologies.

SUMMARY

Embodiments of the disclosure provide a display device including: a housing, a display screen, a driving device, and a measuring component, wherein an opening is arranged on the housing, at least a part of the display screen is located in the housing, and the display screen is connected with the driving device, wherein the driving device is configured to drive the display screen to extend out of the housing through the opening, and/or to drive the display screen to retract into the housing through the opening; and the measuring component is configured to measure a length of the display screen extending out of the housing.

In some embodiments, the measuring component includes an induction coil, a resistor, a voltage detecting component, and a magnetic field generator, the induction coil is arranged on the display screen and is a closed planar coil, the resistor is connected in series with the induction coil, and the voltage detecting component is configured to detect voltage across the resistor; and the magnetic field generator is arranged at the opening, and while the display screen is extending out of the housing, or retracting into the housing through the opening, at least a part of a magnetic field generated by the magnetic field generator overlaps with an area surrounded by the induction coil, a size of an overlapping area varies gradually, and the overlapping area is such a part of the area surrounded by the induction coil that overlaps with the magnetic field.

In some embodiments, a shape of a contour of the induction coil is a trapezoid, an upper base of the trapezoid is located on one end portion of the display screen in a first direction, and a lower base of the trapezoid is located on the other end portion of the display screen in the first direction, wherein the first direction is a motion direction of the display screen while the display screen is extending out of the housing, or retracting into the housing; and the magnetic field intersects with at least one waist of the trapezoid, and a part of the overlapping area is located between the upper base and the lower base of the trapezoid.

In some embodiments, the shape of the contour of the induction coil is a right trapezoid, the magnetic field intersects with an oblique waist of the right trapezoid, and the overlapping area is spaced from a right-angled waist of the right trapezoid.

In some embodiments, a shape of a contour of the induction coil is a triangle, a base of the triangle is located on one end portion of the display screen in a first direction, and a vertex of the triangle is located on the other end portion of the display screen in the first direction, wherein the first direction is a motion direction of the display screen while the display screen is extending out of the housing, or retracting into the housing; and the magnetic field generated by the magnetic field generator intersects with two sides of the triangle.

In some embodiments, a shape of a contour of the induction coil is a parallelogram, one base of the parallelogram is located on one end portion of the display screen in a first direction, the other base of the parallelogram is located on the other end portion of the display screen in the first direction, wherein the first direction is a motion direction of the display screen while the display screen is extending out of the housing, or retracting into the housing; and the overlapping area intersects with one oblique side of the parallelogram, and spaced from the other oblique side thereof, and a part of the overlapping area is located between the two bases of the parallelogram.

In some embodiments, a resistance of the resistor is $R_1$, a resistance of the induction coil is $R_2$, and $R_1$ and $R_2$ satisfy that $R_1>1000R_2$.

In some embodiments, a direction of the magnetic field is perpendicular to a coil plane of the induction coil.

In some embodiments, a coil plane of the induction coil is parallel to a display surface of the display screen.

In some embodiments, the induction coil is a flexible coil.

In some embodiments, the induction coil is arranged on an outer surface of the display screen.

In some embodiments, the magnetic field generator includes a power supply component and a magnetic coil, and wherein the power supply component includes a direct-current power supply component connected with the magnetic coil.

In some embodiments, the power supply component further includes an alternating-current power supply component connected the magnetic coil.

In some embodiments, the magnetic field generator includes a first magnetic pole and a second magnetic pole, wherein the first magnetic pole and the second magnetic pole are unlike magnetic poles, and when the display screen is expanded, the first magnetic pole and the second magnetic pole are located respectively on two sides of the display screen in a thickness direction thereof.

In some embodiments, the measuring component includes a resistor strip, a power supply, a fixed contact, and a current detecting component; the resistor strip is arranged on the display screen, and when the display screen is expanded, the resistor strip extends in a first direction, wherein the first direction is a motion direction of the display screen while the display screen is extending out of the housing, or retracting into the housing; the fixed contact is arranged at the opening of the housing, while the display screen is extending out of the housing, or retracting into the housing, the fixed contact comes into conductive contact with the resistor strip, and is able to slide relative to the resistor strip; and the power supply, the current detecting component, the fixed contact, and the resistor strip are connected sequentially to form a loop.

In some embodiments, the driving device includes a rotation driving component and a reel, the reel is rotatably connected with the housing, the display screen is a flexible display screen, a side of the display screen is connected with the reel, and the rotation driving component is configured to drive the reel into rotation around a central axis of the reel; and while the reel is rotating around the central axis of the reel in a second direction, the display screen is wound onto the reel through the opening; and while the reel is rotating around the central axis of the reel in a third direction opposite to the second direction, the display screen is falling off the reel gradually so that the display screen extends out of the housing through the opening.

In some embodiments, the rotation driving component includes a motor and a decelerating mechanism, and the motor is arranged on the housing, and connected with the reel through the decelerating mechanism in a transmission way.

In some embodiments, the decelerating mechanism includes a first decelerating sub-mechanism and a second decelerating sub-mechanism; the first decelerating sub-mechanism is a deceleration belt transmission mechanism including an input belt wheel, an output belt wheel, and a rotation shaft, wherein the input belt wheel is fixedly sleeved on an output shaft of the motor, the output belt wheel is fixedly sleeved on the rotation shaft, and the rotation shaft is rotatably arranged on the housing or on a housing of the motor; and the second decelerating sub-mechanism includes a group of reduction gears including an input gear and an output gear, wherein the input gear is fixedly sleeved on the rotation shaft, the output gear is fixedly connected with the reel, and a central axis of the output gear is collinear with the central axis of the reel.

In some embodiments, the reel is a hollow reel, and includes a central hole extending through at least one end face of the reel, the driving device further includes a motor bracket, both the motor and the decelerating mechanism are located in a hole chamber of the central hole, the motor bracket is fixedly connected with the housing, and at least a part of the motor bracket extends into the central hole, and is fixedly connected with the motor.

In some embodiments, a viewing screen is arranged on the housing, and configured to at least display information about the length of the display screen extending out of the housing.

BRIEF DESCRIPTION OF THE DRAWINGS

In order to make the technical solutions according to the embodiments of the disclosure, or in the related art more apparent, the drawings to which reference is to be made in the description of the embodiments or the related art will be introduced below in brevity, and apparently the drawings to be described below illustrate only some embodiments of the disclosure, and those ordinarily skilled in the art can further derive other drawings from these drawings without any inventive effort.

DETAILED DESCRIPTION OF THE EMBODIMENTS

Figure 1:
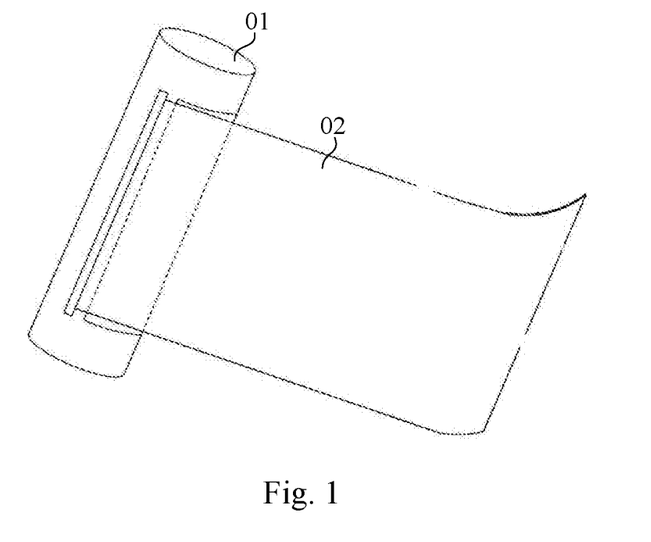
FIG. 1 is a schematic structural diagram of a display device in the related art.

As illustrated in FIG. 1, a display device in the related art includes a cylindrical housing 01, a flexible display screen 02, and a shaft, where the cylindrical housing 01 includes a cylindrical chamber in which the shaft is arranged, an end of the flexible display screen 02 is fixed on the shaft, and the shaft can rotate around a central axis thereof so that the flexible display screen 02 can be switched between an expanded state and a curled state.

While the display device is operating, generally only a part of a display area of the flexible display screen 02 extends out of the cylindrical housing 01, and the other part of the display area is located in the cylindrical housing 01, and an image is displayed in the part of the display area of the flexible display screen 02 in the cylindrical housing 01, so that the image displayed on the flexible display screen 02 does not match an image displayed in a valid observation area of a user, and power consumption of the flexible display screen 02 is increased, thus greatly shortening the lifetime of the flexible display screen 02.

The technical solutions according to the embodiments of the disclosure will be described below clearly and fully with reference to the drawings in the embodiments of the disclosure. Apparently the embodiments to be described are only a part but not all of the embodiments of the disclosure. Based upon the embodiments here of the disclosure, all of other embodiments which can occur to those ordinarily skilled in the art without any inventive effort shall come into the claimed scope of the disclosure.

In the description of the disclosure, it shall be appreciated that orientation or positional relationships indicated by the terms "center", "above", "below", "front", "back", "left", "right", "vertical", "horizontal", "top", "bottom", "in", "out of", etc., are orientation or positional relationships indicated in the drawings, and only intended to illustrate the disclosure for the sake of a convenient description, but not intended to indicate or suggest any specific orientation or specific orientation construction or operation indispensable to a device or an element as illustrated, so the disclosure will not be limited thereto.

The terms "first", "second", etc., are only intended to represent technical features, but not intended to indicate or imply their importance relative to each other, or to suggest implicitly the number of indicated technical features. Accordingly, the features preceded by the terms "first", "second", etc., can indicate explicitly or imply implicitly that one or more such features are included. In the description of the disclosure, the term "plurality of" refers to "two or more" unless stated otherwise.

In the description of the disclosure, it shall be noted that the terms "install", "connected", "connect", etc., shall be interpreted broadly unless stated otherwise, and for example, elements can be connected fixedly or removably or integrally, and can be connected directly or connected indirectly through an intermediate medium or connected internally. Those ordinarily skilled in the art can interpret particular meaning of the terms above in the disclosure in particular instances.

Figure 2:
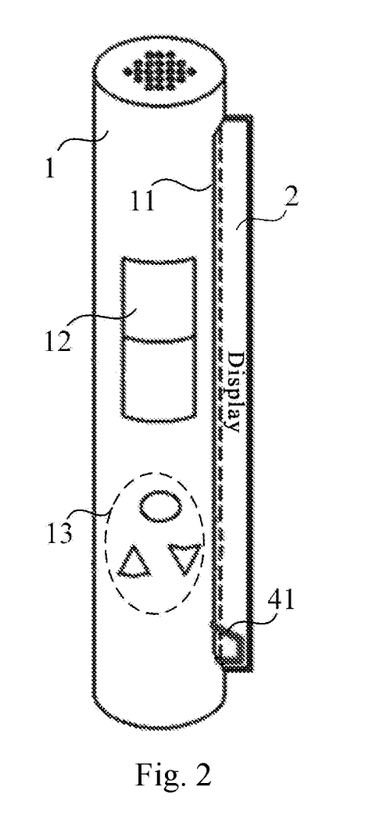
FIG. 2 is a schematic structural diagram of a display device according to the embodiments of the disclosure.
Figure 3:
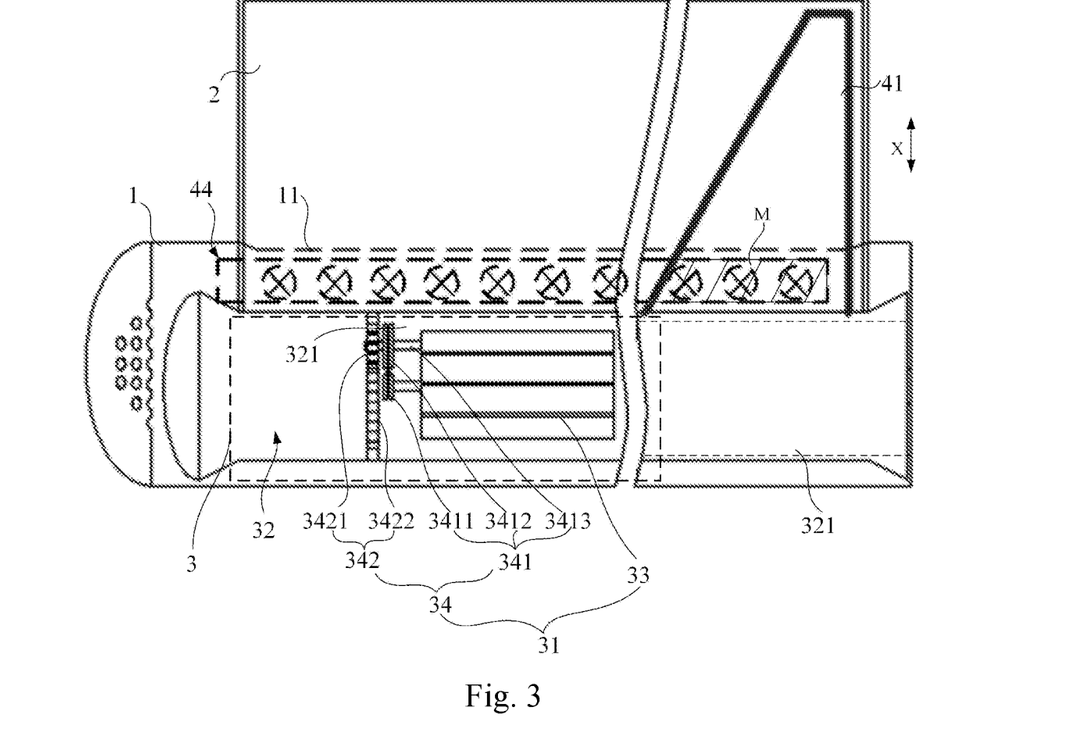
FIG. 3 is a schematic structural diagram of a part of a display device according to the embodiments of the disclosure in a sectional view.
Figure 5:
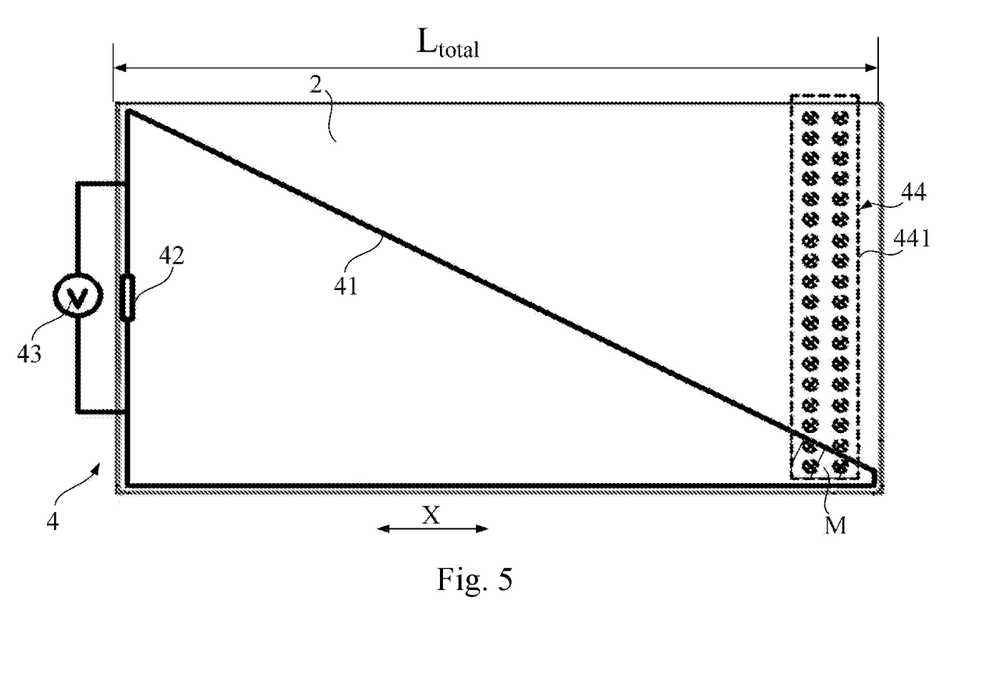
FIG. 5 is a schematic structural diagram of a measuring component according to the embodiments of the disclosure.

As illustrated in FIG. 2 and FIG. 3, the embodiments of the disclosure provide a display device including a housing 1, a display screen 2, a driving device 3, and a measuring component 4, where an opening 11 is arranged on the housing 1, a part (or all) of the display screen 2 is located in the housing 1, the display screen 2 is connected with the driving device 3, and the driving device 3 is configured to drive the display screen 2 to extend out of the housing 1, and/or to retract into the housing 1 through the opening 11; and as illustrated in FIG. 5, the measuring component 4 is configured to measure a length of the display screen 2 extending out of the housing 1. While the display device is operating, the driving device 3 drives the display screen 2 into motion so that the display screen 2 extends out of the housing 1 through the opening 11, so the display screen 2 can display an image, a video, etc., for watching by a user; and after the display device finishes its operation, the driving device 3 drives the display screen 2 into motion in an opposite direction so that the display screen 2 retracts into the housing 1 through the opening 11 to thereby narrow a space occupied by the display device so as to make it convenient for the user to carry. The display device can be a mobile phone, a tablet computer, an advertisement screen, or another terminal device.

In some embodiments, in the display device, the driving device 3 can alternatively be only configured to drive the display screen 2 to extend out of the housing 1 through the opening 11, and after the display device finishes its operation, the user can push the display screen 2 back into the housing 1 manually; or the driving device 3 can alternatively be only configured to drive the display screen 2 to retract into the housing 1 through the opening 11, and while the display device is operating, the user can pull the display screen 2 manually so that the display screen 2 extends out of the housing 1. The measuring component 4 can be arranged in a curl display device (as illustrated in FIG. 3) or another display device including a retractable display screen.

The display device according to the embodiments of the disclosure includes the measuring component 4 configured to measure the length of the flexible display screen extending out of the housing 11, so while the display device is operating, the measuring component 4 can measure the length of the flexible display screen extending out of the housing 11, and a control component in the display device can adjust a size of an image displayed on the flexible display screen according to the length of the flexible display screen extending out of the housing 11, measured by the measuring component 4, to match the size of the image with the length of the flexible display screen extending out of the housing 11 so that the user can really see the entire image, but also a power loss of the display screen 2 when the image is displayed outside a valid observation area of the user can be avoided to thereby prolong the lifetime of the display screen 2.

It shall be noted that, the measuring component 4 can measure the length of the display screen 2 extending out of the housing 11 directly or directly. For example, the measuring component 4 can firstly measure the length of the display screen 2 in the housing 1, and then determine the length of the display screen 2 extending out of the housing 1 as a difference between the total length of the display screen 2, and the length of the display screen 2 in the housing 1. In some embodiments, the total length of the display screen 2 refers to the size of the display screen 2 in a first direction X, e.g., $L_{total}$ as illustrated in FIG. 2, the length of the display screen 2 in the housing 1 refers to the size of the part of the display screen 2 in the housing 1 in the first direction X, and the length of the display screen 2 extending out of the housing 1 refers to the size of the part of the display screen 2 extending out of the housing 1 in the first direction X, where the first direction X is a motion direction of the display screen 2 while the display screen 2 is extending out of the housing 1, or retracting into the housing 1.

Figure 6:
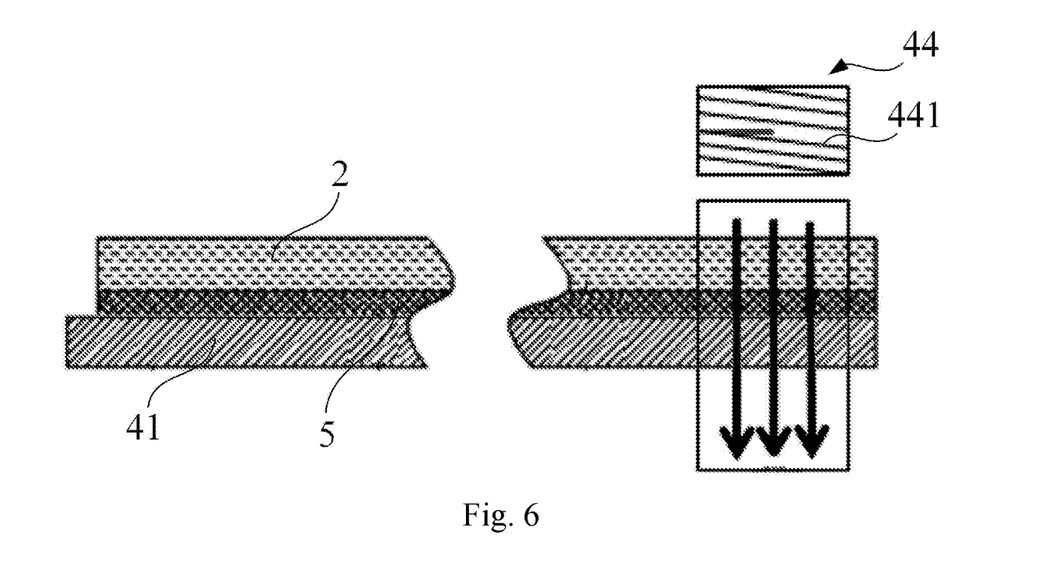
FIG. 6 is a sectional view of an induction coil in a measuring component, which is fit onto a display screen according to the embodiments of the disclosure.

In the embodiments of the disclosure, the measuring component 4 can be structured in a number of implementations, for example, the measuring component 4 can be structured, as illustrated in FIG. 3, FIG. 5, and FIG. 6, as follows: the measuring component 4 includes an induction coil 41, a resistor 42, a voltage detecting component 43, and a magnetic field generator 44, where the induction coil 41 is arranged on the display screen 2, and is a closed planar coil, the resistor 42 is connected in series with the induction coil 1, the voltage detecting component 43 is configured to detect voltage across the resistor 42, the magnetic field generator 44 is arranged at the opening 11, and while the display screen 2 is extending out of the housing 1, or retracting into the housing 1 through the opening 11, a part of a magnetic field generated by the magnetic field generator 44 overlaps with an area surrounded by the induction coil 41, where a size of an overlapping area M varies gradually, and the overlapping area M is such a part of the area surrounded by the induction coil 41 that overlaps with the magnetic field.

It shall be noted that, the voltage detecting component 43 can be a voltage meter, or can be another voltage detecting element, although the embodiments of the disclosure will not be limited thereto; and a part (as illustrated in FIG. 3) or all of the magnetic field generated by the magnetic field generator 44 may overlap with the area surrounded by the induction coil 41, although the embodiments of the disclosure will not be limited thereto.

A principle for the measuring component 4 to measure the length of the display screen 2 extending out of the housing 1 will be described below in details by way of an example in which a shape of a contour of the induction coil 41 is a right trapezoid.

Figure 7:
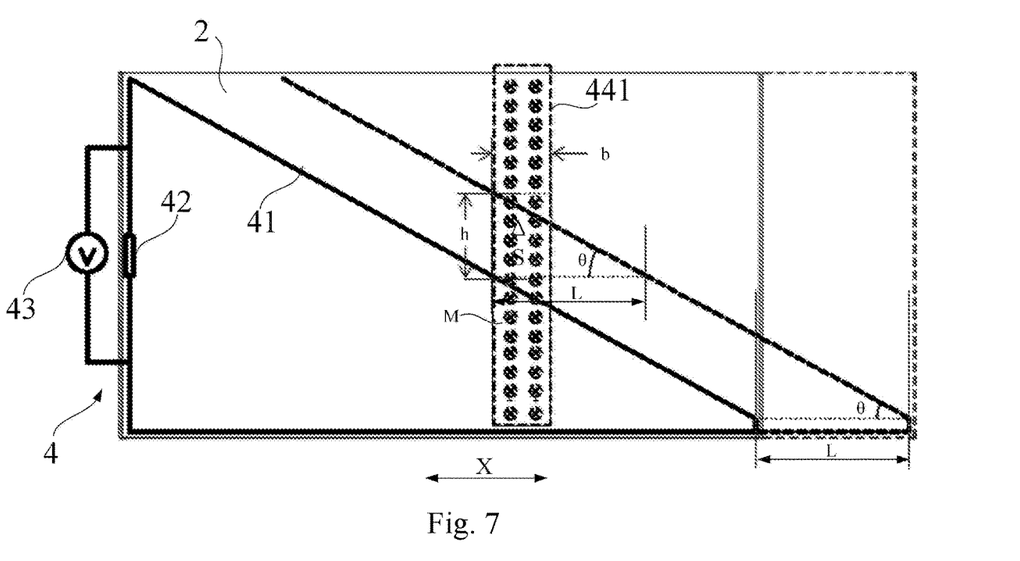
FIG. 7 is a schematic diagram of a measuring component measuring in real time a length of a display screen extending out of a housing according to the embodiments of the disclosure.

As illustrated in FIG. 7, while the display screen 2 is extending out of the housing 1 from its initial position, the induction coil 41 is extending out of the housing 1 together with the display screen 2, so that the oblique side of the induction coil 41 is moving through magnetic induction lines of the magnetic field generated by the magnetic field generator 44, and the size of the overlapping area M is increasing gradually; and as per the electromagnetic induction principle, as a magnetic flux in the induction coil 41 is varying, current is generated in the induction coil 41, and a corresponding electromotive force is generated as per Equation (1) of: $E = n\Delta\varphi/\Delta t$, where n is typically 1.

At this time, the voltage detecting component 43 measures the voltage U across the resistor 42, and for example, a resistance of the resistor 42 is $R_1$, and a resistance of the induction coil 41 is $R_2$, so the induced electromotive force can be defined in Equation (2) of: $E = U(R_1 + R_2)/R_1$.

As illustrated in FIG. 7, for example, the length of the display screen 2 extending out of the housing 1 varies by $\Delta L$, and an area of the overlapping area M increases by $\Delta S$, in a certain period of time $\Delta t$; and an angle between the oblique side (i.e. the oblique waist) and the right-angled side (i.e. the right-angled waist) of the right trapezoid is $\theta$, a size of the overlapping area M in the first direction X is b, the oblique side of the right trapezoid is displaced by h in a direction perpendicular to the first direction X, and an intensity of the constant magnetic field generated by the magnetic field generator 44 is B; so as per their geometrical relationships, Equation (3) of $\Delta S=bh=\Delta Lb \tan \theta$ can be obtained, and a magnetic flux of the induction coil 41 can vary by $\Delta \varphi$, which can be defined in Equation (4) of: $\Delta \varphi = \Delta S \cdot B$.

Accordingly, the following Equation (5) can be derived from Equations (1) to (4): $\Delta L = (R_1+R_2)U\Delta t/\tan \theta R_1 bB$.

Since all of $R_1$, $R_2$, U, $\Delta t$, $\theta$, b, and B in Equation (5) are known, the variation of the length of the display screen 2 extending out of the housing 1 in the period of time $\Delta t$ can be calculated as $\Delta L$, a corresponding variation of the length of the display screen 2 extending out of the housing 1 can be calculated as $\Delta L$ each time the voltage detecting component 43 measures the voltage U across the resistor 42 at an interval of time $\Delta t$ while the display screen 2 is extending out of the housing 1 (at a constant speed, a constant acceleration, or a varying acceleration), and then respective $\Delta L$ can be integrated (for an analog signal) or accumulated (for a digital signal) to thereby obtain a final length L of the display screen 2 extending out of the housing 1: $L=L_0+\Delta L_1+\Delta L_2+\Delta L_3 \ldots$; where $L_0$ is the length of the display screen 2 initially extending out of the housing.

After the display screen 2 is completely expanded, the control component of the display device can record information about the length L into a size information register (e.g., an Erasable and Programmable Read Only Memory (EPROM)) as the length $L_0$ of the display screen 2 initially extending out of the housing so that the length of the display screen 2 extending out of the housing can be measured while the display screen 2 is retracting; and also the control component can adjust the size of a displayed image on the display screen 2 according to the length L to thereby match the size of the image with the length L of the display screen 2 extending out of the housing 1.

While the display screen 2 is retracting into the housing 1, the area of the overlapping area M is decreasing gradually, and the magnetic flux is decreasing; and the voltage detecting component 43 measures the voltage U across the resistor 42 as negative voltage, where the length L of the display screen 2 extending out of the housing in this process can be calculated in the same way as the length of the display screen 2 extending out of the housing 1 from the initial position, so a repeated description thereof will be omitted here.

In alternative to the structure above, the measuring component 4 can be structured as follows: the measuring component 4 includes a resistor strip arranged on the display screen 2, and when the display screen 2 is expanded, the resistor strip extends in the first direction X; and the measuring component 4 further includes a power supply, a fixed contact, and a current detecting component, where the fixed contact is arranged at the opening 11 of the housing 11, while the display screen 2 is extending out of the housing 1, or retracting into the housing 1, the fixed contact can come into conductive contact with the resistor strip, and can slide relative to the resistor strip, and the power supply, the current detecting component, the fixed contact, and the resistor strip are connected sequentially to form a loop. While the display screen 2 is extending out of the housing 1, or retracting into the housing 1, a position where the fixed contact comes into contact with the resistor strip is varying, so a resistance of the resistor strip in the loop is also varying, and current in the loop detected by the current detecting component is also varying, so the length L of the display screen 2 extending out of the housing 1 can be measured according to the current I detected by the current detecting component, and a correspondence relationship between the length L of the display screen 2 extending out of the housing 1, and the current I.

The measuring component 4 in either of the two structures above can measure the length L of the display screen 2 extending out of the housing 1, but as compared with the embodiments in which the measuring component 4 includes the resistor strip, the length L of the display screen 2 extending out of the housing 1 is measured according to a relationship between the variation of the induced electromotive force generated due to the magnetic flux in the induction coil 41 while the display screen 2 is extending out of or retracting into the housing, and the length L of the display screen 2 extending out of the housing 1 in the embodiments in which the measuring component 4 includes the induction coil 41, the resistor 42, the voltage detecting component 43, and the magnetic field generator 44, so the length L can be measured precisely while being less affected by a surrounding environment.

In the embodiments in which the measuring component 4 includes the induction coil 41, the resistor 42, the voltage detecting component 43, and the magnetic field generator 44, the shape of the contour of the induction coil 41 will not be limited to any particular shape, and as illustrated in FIG. 5, for example, the shape of the contour of the induction coil 41 is a trapezoid, where an upper base of the trapezoid is located on one end portion of the display screen 2 in the first direction X, and a lower base of the trapezoid is located on the other end portion of the display screen in the first direction X; and the magnetic field intersects with one waist (or both waists) of the trapezoid, and a part of the overlapping area M is located between the upper base and the lower base of the trapezoid, so that while the display screen 2 is extending out of or retracting into the housing, the size of the overlapping area M is varying constantly so that the electromotive force can be generated by the induction coil 41, so the length L of the display screen 2 extending out of the housing 1 can be measured according to the electromotive force generated by the induction coil 41.

In the induction coil 41, both the upper base and the lower base of the trapezoid can be flush with a side edge of the display screen 2 in the first direction X, or spaced from that side edge (as illustrated in FIG. 5) by 5 mm, although the embodiments of the disclosure will not be limited thereto.

It shall be noted that, when the display screen 2 is a flexible display screen, the shape of the contour of the induction coil 41 refers to the shape of the contour of the induction coil 41 when the display screen 2 is expanded.

In some embodiments, the shape of the contour of the induction coil 41 can be a general trapezoid, or can be an isosceles trapezoid, or can be a right trapezoid. When the shape of the contour of the induction coil 41 is a right trapezoid, the positional relationship between the overlapping area M, and the right-angled side of the right trapezoid will not be limited to any particular positional relationship, and for example, a boundary of the overlapping area M may overlap with the right-angled side of the right trapezoid, or the boundary of the overlapping area M may be spaced from the right-angled side of the right trapezoid by some distance, for example, as illustrated in FIG. 5, the magnetic field intersects with the oblique side of the right trapezoid, and the overlapping area M is spaced from the right-angled side of the right trapezoid. As compared with the embodiments in which the boundary of the overlapping area M overlaps with the right-angled side of the right trapezoid, the boundary of the overlapping area M will not coincide with the right-angled side of the right trapezoid in the embodiments in which the boundary of the overlapping area M is spaced from the right-angled side of the right trapezoid by some distance (as illustrated in FIG. 5), so that the magnetic field generator 44 and the induction coil 41 can be installed less precisely to thereby lower the installation cost of the magnetic field generator 44 and the induction coil 41.

The shape of the contour of the induction coil 41 can alternatively be a triangle instead of a trapezoid, where a base of the triangle is located on one end portion of the display screen 2 in the first direction X, and a vertex of the triangle is located on the other end portion of the display screen 2 in the first direction X; and the magnetic field generated by the magnetic field generator 44 intersects with two sides (e.g. two waists) of the triangle, so that the size of the overlapping area M can also be varying constantly as the display screen 2 is extending out of or retracting into the housing, where the triangle can be a normal triangle, or can be an isosceles triangle, or can be a right triangle, although the embodiments of the disclosure will not be limited thereto.

Moreover, the shape of the contour of the induction coil 41 can alternatively be a parallelogram, where one base of the parallelogram is located on one end portion of the display screen 2 in the first direction X, the other base of the parallelogram is located on the other end portion of the display screen 2 in the first direction X, the overlapping area M intersects with one oblique side of the parallelogram, and spaced from the other oblique side thereof, and a part of the overlapping area M is located between the two bases of the parallelogram, so that the size of the overlapping area M can also be varying constantly as the display screen 2 is extending out of or retracting into the housing.

In the measuring component 4, the resistance of the resistor 42 is $R_1$, and the resistance of the induction coil 41 is $R_2$, where a relationship between $R_1$ and $R_2$ will not be limited to any particular relationship, and for example, $R_1$ may be approximate to $R_2$, or $R_1$ may be far more than $R_2$, e.g., $R_1 > 1000 R_2$. As compared with $R_1$ being approximate to $R_2$, $R_1$ is far more than $R_2$ so that almost all of the electromotive force generated by the induction coil 41 lies across the resistor 42, so even if the length of the display screen 2 extending out of the housing 1 is smaller, and the electromotive force generated by the induction coil 41 is smaller, then the voltage detecting component 43 will detect the voltage across the resistor 42 to thereby greatly alleviate the voltage across the resistor 42 from becoming so low that goes beyond the detection precision of the voltage detecting component 43, so as to improve the accuracy at which the measuring component 4 detects the length of the display screen 2 extending out of the housing 1.

In the measuring component 4, a direction of the magnetic field generated by the magnetic field generator 44 will not be limited to any particular direction, and for example, the direction of the magnetic field generated by the magnetic field generator 44 may be perpendicular to a coil plane of the induction coil 41, or the direction of the magnetic field generated by the magnetic field generator 44 may be inclined from the coil plane of the induction coil 41. Given an intensity of the magnetic field generated by the magnetic field generator is constant, as compared with the magnetic field generated by the magnetic field generator 44 being inclined from the coil plane of the induction coil 41, a larger induced electromotive force can be generated by the induction coil 41 as the overlapping area M is varying when the direction of the magnetic field generated by the magnetic field generator 44 is perpendicular to the coil plane of the induction coil 41, so that the voltage detecting component 43 can easily detect the voltage across the resistor 42.

It shall be noted that, when the display screen 2 is a flexible display screen, the coil plane of the induction coil 41 refers to a coil plane of the induction coil 41 when the flexible display screen is expanded.

In the measuring component 4, the type of the induction coil 41 will not be limited to any particular type, and for example, the induction coil 41 may be an inflexible coil which can operate with an inflexible display screen, or the induction coil 41 may be a flexible coil which can operate with a flexible display screen, and after the flexible display screen retracts into the housing 1, the flexible display screen can be curled or folded so that the induction coil 41 can be deformed together with the flexible display screen so that the flexible display screen is curled or folded.

When the induction coil 41 is a flexible coil, as illustrated in FIG. 5 and FIG. 6, the induction coil 41 can be structured as a thin film, and the induction coil 41 can be made of a material with a high conductivity and flexibility, e.g., copper, silver, etc.

In the measuring component 4, the structure of the magnetic field generator 44 will not be limited to any particular structure, and for example, the magnetic field generator 44 can be structured as follows: as illustrated in FIG. 5 and FIG. 6, the magnetic field generator 44 includes a power supply component and a magnetic coil 441, where the power supply component includes a direct-current power supply component connected with the magnetic coil 441, and configured to provide the magnetic coil 441 with direct-current so that the magnetic coil 441 can generate the magnetic field overlapping with the area surrounded by the induction coil 41.

Further, the magnetic field generator 44 can alternatively be structured as follows: the magnetic field generator 44 includes a first magnetic pole and a second magnetic pole, where the first magnetic pole and the second magnetic pole are unlike magnetic poles, and when the display screen 2 is expanded, the first magnetic pole and the second magnetic pole are located respectively on two sides of the display screen 2 in a thickness direction thereof so that a magnetic field can be generated between the first magnetic pole and the second magnetic pole. As compared with the embodiments in which the magnetic field generator 44 includes the first magnetic pole and the second magnetic pole, the direct-current power supply component in the embodiments in which the magnetic field generator 44 includes the power supply component and the magnetic coil 441 can adjust current input to the magnetic coil 441 as needed in reality to thereby control the magnitude of the magnetic field generated by the magnetic coil 441 so that the magnetic field generator 44 is highly adaptive; and moreover, the magnetic coil 441 can be arranged on one side of the display screen 2 to thereby narrow an occupied space in the housing 1.

While the display device is operating, the display screen 2 may not be located at a preset initial position due to various reasons, e.g., unexpected power supply outage, the display screen 2 being stuck, restarting the display device by the user, etc., and if the measuring component 4 measures the length of the display screen 2 extending out of the housing 1 with reference to the preset initial position of the display screen, then there will be an inaccurate measurement result; and in order to determine a real initial position of the display screen 2, the power supply component further includes an alternating-current power supply component connected with the magnetic coil 441. The alternating-current power supply component can input alternating current to the magnetic coil 441 so that the magnetic coil 441 generates a varying magnetic field, so the magnetic flux in the overlapping area M varies; and the area of the overlapping area M is calculated according to a relationship between the voltage across the resistor 42, and the area of the overlapping area M, and then the length of the display screen 2 initially extending out of the housing 1 is calculated according to a relationship between the area of the overlapping area M, and the length of the display screen 2 extending out of the housing 1. A measurement process will be described below by way of an example in which the contour of the induction coil 41 is a right trapezoid.

For example, the intensity of the magnetic field generated by the magnetic coil 441 increased from $B_0$ to $B_1$ in a period of time $\Delta t$, so there is a difference $\Delta B$ in intensity of the magnetic field, and the voltage detecting component 43 measures the voltage across the resistor 42 as U, and there is an Equation (6) of $\Delta \varphi = S \Delta B$, then as per Equations (1), (2), and (6), an initial area of the overlapping area M can be calculated in Equation (7) of: $S = \Delta t U(R_1 + R_2)/R_1 \Delta B$.

Figure 8:
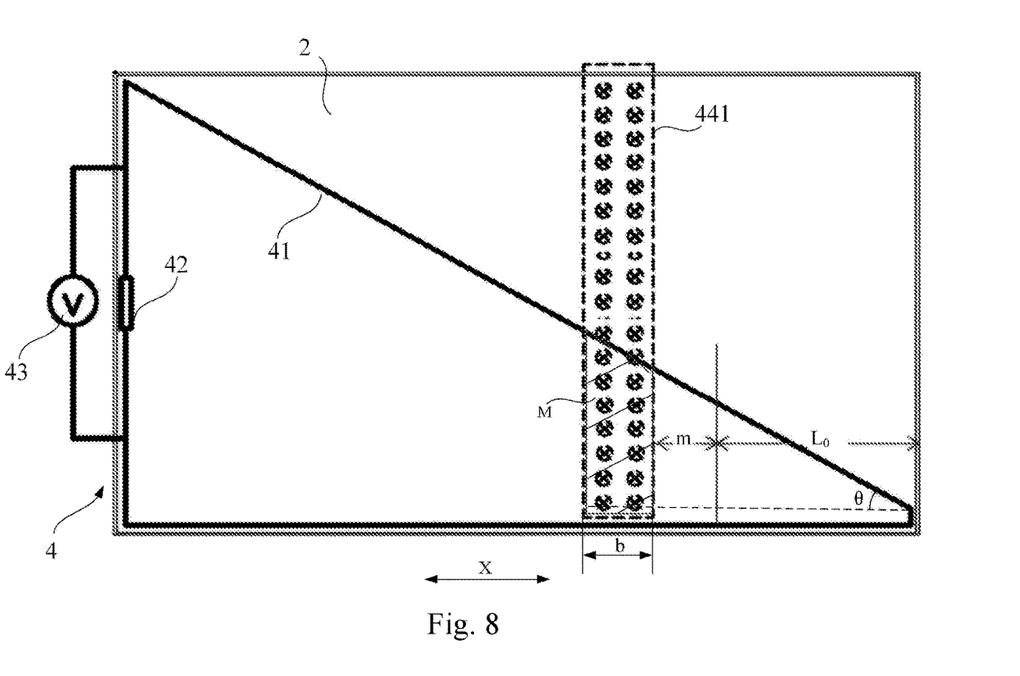
FIG. 8 is a schematic diagram of a measuring component measuring a length of a display screen initially extending out of a housing according to the embodiments of the disclosure.

As illustrated in FIG. 8, for example, the angle between the oblique side and the right-angled side of the right trapezoid is $\theta$, the size of the overlapping area M in the first direction X is b, the length of the display screen 2 initially extending out of the housing 1 is $L_0$, and a distance between the boundary of the magnetic field generated by the magnetic coil 441, and an upper edge of the opening 11 of the housing 1 is m, then as per their geometrical relationships, Equation (8) of $S = b \tan \theta(2m + 2L_0 + b)/2$ can be obtained, and the following Equation (9) can be derived from Equations (7) and (8): $L_0 = (R_1 + R_2)\Delta t U/\tan 0 R_1 \Delta B b - m - b/2$.

Since all the parameters on the right side of Equation (9) are known, the length $L_0$ of the display screen 2 initially extending out of the housing 1 can be calculated.

The measuring component 4 measures the length $L_0$ of the display screen 2 initially extending out of the housing 1, so no matter whether the display screen 2 is located on the preset initial position or not, the measuring component 4 can obtain the real length $L_0$ of the display screen 2 initially extending out of the housing 1, and measure in real time the length of the display screen 2 extending out of the housing 1 according to the real length $L_0$ to thereby obtain an accurate measurement result.

In the display device according to the embodiments of the disclosure, when the display screen 2 is a single-sided display screen, the induction coil 41 can be arranged on a backside of the display screen 2, and as illustrated in FIG. 6, for example, the induction coil 41 is bonded and fixed on the backside of the display screen 2. The induction coil 41 can be bonded in the following process flow: the induction coil 41 is rinsed, the induction coil 41 is covered with a bonding layer 5, e.g., an adhesive layer, the display screen 2 is rinsed, and the induction coil 41 is bonded with the display screen 2.

In some embodiments, rinsing of the induction coil 41 and the display screen 2 can be controlled using a droplet nozzle. In order to bond the induction coil 41 with the display screen 2 at a preset position, a mark can be arranged on the display screen 2, e.g., at a corner of the display screen, so that the induction coil 41 can be bonded accurately with the display screen 2 at the preset position.

In some embodiments, the number of marks arranged on the display screen 2 may be three, where each mark is arranged at a corresponding corner of the display screen 2.

When the display screen 2 is a double-sided display screen, in order to avoid the induction coil 41 from shielding the display area of the display screen 2, the induction coil 41 is made of a transparent material, e.g., Indium Tin Oxide (ITO). Alternatively, the induction coil 41 can be made of a metal material, e.g., copper, silver, etc, and the induction coil 41 can be arranged outside the display area of the display screen 2 so as not to shield the display area of the display screen 2.

In the measuring component 4, the induction coil 41 can be arranged on an outer surface of the display screen 2, and for example, the induction coil 41 can be arranged on a side surface of the display screen 2. Moreover, as illustrated in FIG. 3 and FIG. 6, the induction coil 41 can alternatively be arranged on the backside of the display screen 2. The induction coil 41 can alternatively be arranged inside the display screen 2 instead of being arranged on the outer surface of the display screen 2, and for example, the induction coil 41 can be formed together with pixel units to thereby fabricate an array substrate.

Figure 4:
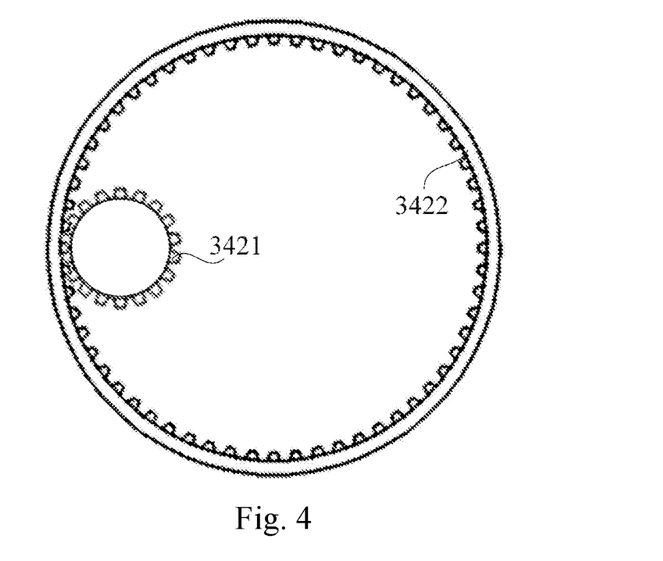
FIG. 4 is a schematic structural diagram of engaged input and output gears in a group of reduction gears according to the embodiments of the disclosure.

In the display device according to the embodiments of the disclosure, while the display screen 2 is extending out of the housing 1, or retracting into the housing 1 through the opening 11, the driving device 3 can drive the display screen 2 into motion in any one of a number of forms, and for example, the driving device 3 can drive the display screen 2 to be wound on a reel 32 (the display device is a curl display device). For example, as illustrated in FIG. 3 and FIG. 4, the driving device 3 includes a rotation driving component 31, and the reel 32 rotatably connected with the housing 1, and the display screen 2 is a flexible display screen, where a side of the display screen 2 is connected with the reel 32, and the rotation driving component 31 is configured to drive the reel 32 into rotation around a central axis of the reel 32. When the reel 32 rotates around the central axis of the reel 32 in a second direction, the display screen 2 is wound onto the reel 32 through the opening 11, and when the reel 32 rotates around the central axis of the reel 32 in a third direction opposite to the second direction, the display screen 2 falls off the reel 32 gradually so that the display screen 2 extends out of the housing 11 through the opening 11. While the display device is operating, the rotation driving component 31 drives the reel 32 into rotation around the central axis of the reel 32 in the third direction so that the display screen 2 extends out of the housing 11 through the opening 11, and thus the display screen 2 can display an image, a picture, etc., for watching by the user. After the display device finishes the operation, the rotation driving component 31 drives the reel 32 into rotation around the central axis of the reel 32 in the second direction so that the flexible display screen retracts into the housing 1 through the opening 11 to thereby narrow an occupied space of the display device so as to make it convenient for the user to carry.

Further, the driving device 3 can alternatively drive the display screen 2 into linear motion as follows: the driving device 3 includes a linear driving component fixedly connected with the display screen 2, where the display screen 2 is an inflexible display screen, the linear driving component drives the display screen 2 into linear motion so that the display screen 2 extends out of the housing 11, or retracts into the housing 11 through the opening 11. In some embodiments, the linear driving component can be a linear motor.

In the embodiments in which the driving device 3 includes the rotation driving component 31 and the reel 32, the structure of the rotation driving component 31 will not be limited to any particular structure, and as illustrated in FIG. 3, for example, the rotation driving component 31 includes a motor 33 and a decelerating mechanism 34, where the motor 33 is arranged on the housing 1, and connected with the reel 32 through the decelerating mechanism 34 in a transmission way.

Alternatively, the rotation driving component 31 can include the motor 33 but not the decelerating mechanism 34, where the motor 33 is located in the housing 1. As compared with the embodiments in which the rotation driving component 31 includes the motor 33 but not the decelerating mechanism 34, the decelerating mechanism 34 is arranged in the embodiments in which the rotation driving component 31 includes the motor 33 and the decelerating mechanism 34 so that the display screen 2 moves over a shorter distance as an output shaft of the motor 33 is rotating by a round, so that the user can adjust precisely the length of the display screen 2 extending out of the housing 1 to thereby adjust the resolution of the display screen 2.

The display screen 2 can alternatively be driven by a manual rotation driving component 31 instead of the motored rotation driving component 31 above (as illustrated in FIG. 3, for example), that is, the rotation driving component 31 can alternatively include a manual regulating wheel located in the housing 1, and connected with the reel 32 in a transmission way, where the user can rotate the manual regulating wheel to thereby put the reel 32 into rotation so as to adjust the length of the display screen 2 extending out of the housing 1.

In the embodiments in which the rotation driving component 31 includes the motor 33 and the decelerating mechanism 34, the structure of the decelerating mechanism 34 will not be limited to any particular structure, and as illustrated in FIG. 3 and FIG. 4, for example, the decelerating mechanism 34 can include a first decelerating sub-mechanism 341 and a second decelerating sub-mechanism 342, where the first decelerating sub-mechanism 341 is a deceleration belt transmission mechanism including an input belt wheel 3411, an output belt wheel 3412, and a rotation shaft 3413, where the input belt wheel 3411 is fixedly sleeved on the output shaft of the motor 33, the output belt wheel 3412 is fixedly sleeved on the rotation shaft 3413, and the rotation shaft 3413 is rotatably arranged on a housing of the motor 33 (or on the housing 1); and the second decelerating sub-mechanism 342 includes a group of reduction gears including an input gear 3421 and an output gear 3422, where the input gear 3421 is fixedly sleeved on the rotation shaft 3413, the output gear 3422 is fixedly connected with the reel 32, and a central axis of the output gear 3422 is collinear with the central axis of the reel 32.

Alternatively, the decelerating mechanism 34 can include the second decelerating sub-mechanism 342 but not the first decelerating sub-mechanism 341, and the input gear 3421 can be fixedly sleeved on the output shaft of the motor 33. As compared with the embodiments in which the decelerating mechanism 34 includes the second decelerating sub-mechanism 342 but not the first decelerating sub-mechanism 341, the deceleration belt transmission mechanism is arranged in the embodiments in which the decelerating mechanism 34 includes the first decelerating sub-mechanism 341 and the second decelerating sub-mechanism 342, so that the motor 33 can be protected from being damaged, by a slipping transmission belt in the deceleration belt transmission mechanism while the user is pulling the display screen 2, thus prolonging the service lifetime of the motor 33.

In the embodiments in which the rotation driving component 31 includes the motor 33 and the decelerating mechanism 34, the positions at which the motor 33 and the decelerating mechanism 34 are arranged will not be limited to any particular positions, and for example, the motor 33 and the decelerating mechanism 34 can be arranged inside the reel 32 as illustrated in FIG. 3, where the reel 32 is a hollow reel (which can be referred to as a roller), and includes a central hole 321 extending through an end face of the reel 32, the driving device 3 further includes a motor bracket, both the motor 33 and the decelerating mechanism 34 are located in a hole chamber of the central hole 321, the motor bracket is fixedly connected with the housing 1, and at least a part of the motor bracket extends into the central hole 321, and is fixedly connected with the motor 33. Here the central hole 321 can alternatively extend through two end faces of the reel 32.

In some embodiments, the motor 33 and the decelerating mechanism 34 can alternatively be arranged outside the reel 32. As compared with the motor 33 and the decelerating mechanism 34 arranged outside the reel 32, the motor 33 and the decelerating mechanism 34 are arranged inside the reel 32 so that the motor 33 and the decelerating mechanism 34 can make full use of the internal space of the reel 32 to thereby greatly narrow the space occupied by the driving device 3 so as to narrow the volume of the display device, thus making it more convenient to carry.

In the embodiments in which the motor 33 and the decelerating mechanism 34 are arranged inside the reel 32, as illustrated in FIG. 3 and FIG. 4, the output gear 3422 of the group of reduction gears is an internal gear fixedly arranged in the central hole 321, and the input gear 3421 of the group of reduction gears is an external gear engaged with the output gear 3422.

In the decelerating mechanism 34, the group of reduction gears can include two gears (as illustrated in FIG. 3), or can include more than two gears, although the embodiments of the disclosure will not be limited thereto; and the deceleration belt transmission mechanism can include two belt wheels (as illustrated in FIG. 3), or can include more than two belt wheels, although the embodiments of the disclosure will not be limited thereto.

In the rotation driving component 31, the motor 33 can be a general motor 33, or can be a stepping motor 33. As compared with the general motor 33, the stepping motor 33 can control the rotation angle of the shaft of the motor 33 precisely according to the number of input pulses to thereby control the rotation angle of the reel 32 more precisely so as to display precisely the length of the display screen 2 extending out of the housing 1.

In some embodiments, a stepping angle of the stepping motor 33, a diameter of the reel 32, and a pixel size of the display screen 2 shall be designed so that the stepping motor 33 drives the display screen 2 per pulse to move over a distance of less than a pixel, and a rotation speed of the stepping motor 33 shall be selected to correspond to the size of the display screen 2. By way of an example in which the stepping angle is 1.8°, the diameter of the reel 32 is 10 mm, the distance of one pixel is 30 μm, and the size of the display screen 2 in the first direction X is 300 mm, when a deceleration ratio of the decelerating mechanism 34 ranges from 5:1 to 10:1, the display screen 2 moves over a distance of less than one pixel as the stepping motor 33 rotates by one stepping angle to thereby satisfy the required design.

When the deceleration ratio of the decelerating mechanism 34 ranges from 5:1 to 10:1, the corresponding rotation speed of the stepping motor 33 can be designed to range from 300 r/min to 500 r/min to thereby satisfy the required design.

As illustrated in FIG. 2, a control button 12 is arranged on the housing 1, and the user can control the motor 33 conveniently using the control button 12 to rotate forward or backward to thereby control the display screen 2 to extend out of or to retract into the housing. The user can also select preset information about the length of the display screen 2 extending out of the housing, using the control button 12 (the information can be set by the user, or can be set upon being shipped from a factory), and after the user selects the preset information, a comparator in the display device can compare the length of the display screen 2 currently extending out of the housing, with the target length of the display screen extending out of the housing, determine their difference, and then control the driving device 3 to drive the display screen 2 into motion until the target length of the display screen extending out of the housing is satisfied.

As illustrated in FIG. 2, a viewing screen 13 is arranged on the housing 1, and configured to display the information about the length of the display screen 2 extending out of the housing 1. The operating user can obtain the information about the length of the display screen 2 extending out of the housing 1, from the viewing screen 13 so that the user can determine in a timely manner whether the display screen 2 reaches the target length of the display screen extending out of the housing, to thereby facilitate his or her operation. Additionally, the viewing screen 13 can display a date, time, and other information.

In the description of this specification, particular features, structures, materials, or characteristics can be combined as appropriate in any one or more embodiments or examples.

The foregoing description only relates to the particular embodiments of the disclosure, but the claimed scope of the disclosure will not be limited thereto, and any variations or alternatives which can readily occur to those skilled in the art without departing from the spirit of the disclosure shall fall into the claimed scope of the disclosure. Accordingly the claimed scope of the disclosure shall be determined by the appended claims.

The invention claimed is:

1. A display device, comprising:
a housing, comprising an opening;
a display screen;
a driving device; and
a measuring component;
wherein at least a part of the display screen is located in the housing, and the display screen is connected with the driving device;
wherein the driving device is configured to drive the display screen to extend out of the housing through the opening, and/or to drive the display screen to retract into the housing through the opening; and
the measuring component is configured to measure a length of the display screen extending out of the housing; and
wherein the measuring component comprises an induction coil, a resistor, a voltage detecting component, and a magnetic field generator, the induction coil is arranged on the display screen and is a closed planar coil, the resistor is connected in series with the induction coil, and the voltage detecting component is configured to detect voltage across the resistor; and
the magnetic field generator is arranged at the opening, and while the display screen is extending out of the housing, or retracting into the housing through the opening, at least a part of a magnetic field generated by the magnetic field generator overlaps with an area surrounded by the induction coil, a size of an overlapping area varies gradually, and the overlapping area is such a part of the area surrounded by the induction coil that overlaps with the magnetic field.

2. The display device according to claim 1, wherein a shape of a contour of the induction coil is a trapezoid, an upper base of the trapezoid is located on one end portion of the display screen in a first direction, and a lower base of the trapezoid is located on the other end portion of the display screen in the first direction, wherein the first direction is a motion direction of the display screen while the display screen is extending out of the housing, or retracting into the housing; and the magnetic field intersects with at least one waist of the trapezoid, and a part of the overlapping area is located between the upper base and the lower base of the trapezoid.

3. The display device according to claim 2, wherein the shape of the contour of the induction coil is a right trapezoid, the magnetic field intersects with an oblique waist of the right trapezoid, and the overlapping area is spaced from a right-angled waist of the right trapezoid.

4. The display device according to claim 1, wherein a shape of a contour of the induction coil is a triangle, a base of the triangle is located on one end portion of the display screen in a first direction, and a vertex of the triangle is located on the other end portion of the display screen in the first direction, wherein the first direction is a motion direction of the display screen while the display screen is extending out of the housing, or retracting into the housing; and the magnetic field generated by the magnetic field generator intersects with two sides of the triangle.

5. The display device according to claim 1, wherein a shape of a contour of the induction coil is a parallelogram, one base of the parallelogram is located on one end portion of the display screen in a first direction, the other base of the parallelogram is located on the other end portion of the display screen in the first direction, wherein the first direction is a motion direction of the display screen while the display screen is extending out of the housing, or retracting into the housing; and the overlapping area intersects with one oblique side of the parallelogram, and spaced from the other oblique side thereof, and a part of the overlapping area is located between the two bases of the parallelogram.

6. The display device according to claim 1, wherein a resistance of the resistor is $R_1$, a resistance of the induction coil is $R_2$, and $R_1$ and $R_2$ satisfy that $R_1 > 1000 R_2$.

7. The display device according to claim 1, wherein a direction of the magnetic field is perpendicular to a coil plane of the induction coil.

8. The display device according to claim 1, wherein a coil plane of the induction coil is parallel to a display surface of the display screen.

9. The display device according to claim 1, wherein the induction coil is a flexible coil.

10. The display device according to claim 1, wherein the induction coil is arranged on an outer surface of the display screen.

11. The display device according to claim 1, wherein the magnetic field generator comprises a power supply component and a magnetic coil, and wherein the power supply component comprises a direct-current power supply component connected with the magnetic coil.

12. The display device according to claim 11, wherein the power supply component further comprises an alternating-current power supply component connected the magnetic coil.

13. The display device according to claim 1, wherein the magnetic field generator comprises a first magnetic pole and a second magnetic pole, wherein the first magnetic pole and the second magnetic pole are unlike magnetic poles, and when the display screen is expanded, the first magnetic pole and the second magnetic pole are located respectively on two sides of the display screen in a thickness direction thereof.

14. The display device according to claim 1, wherein the driving device comprises a rotation driving component and a reel, the reel is rotatably connected with the housing, the display screen is a flexible display screen, a side of the display screen is connected with the reel, and the rotation driving component is configured to drive the reel into rotation around a central axis of the reel; and while the reel is rotating around the central axis of the reel in a second direction, the display screen is wound onto the reel through the opening; and while the reel is rotating around the central axis of the reel in a third direction opposite to the second direction, the display screen is falling off the reel gradually so that the display screen extends out of the housing through the opening.

15. The display device according to claim 14, wherein the rotation driving component comprises a motor and a decelerating mechanism, and the motor is arranged on the housing, and connected with the reel through the decelerating mechanism in a transmission way.

16. The display device according to claim 15, wherein the decelerating mechanism comprises a first decelerating sub-mechanism and a second decelerating sub-mechanism;

the first decelerating sub-mechanism is a deceleration belt transmission mechanism comprising an input belt wheel, an output belt wheel, and a rotation shaft, wherein the input belt wheel is fixedly sleeved on an output shaft of the motor, the output belt wheel is fixedly sleeved on the rotation shaft, and the rotation shaft is rotatably arranged on the housing or on a housing of the motor; and the second decelerating sub-mechanism comprises a group of reduction gears comprising an input gear and an output gear, wherein the input gear is fixedly sleeved on the rotation shaft, the output gear is fixedly connected with the reel, and a central axis of the output gear is collinear with the central axis of the reel.

17. The display device according to claim 15, wherein the reel is a hollow reel, and comprises a central hole extending through at least one end face of the reel, the driving device further comprises a motor bracket, both the motor and the decelerating mechanism are located in a hole chamber of the central hole, the motor bracket is fixedly connected with the housing, and at least a part of the motor bracket extends into the central hole, and is fixedly connected with the motor.

18. The display device according to claim 1, wherein a viewing screen is arranged on the housing, and configured to at least display information about the length of the display screen extending out of the housing.

19. A display device, comprising:

a housing, comprising an opening;

a display screen;

a driving device; and a measuring component;

wherein at least a part of the display screen is located in the housing, and the display screen is connected with the driving device;

wherein the driving device is configured to drive the display screen to extend out of the housing through the opening, and/or to drive the display screen to retract into the housing through the opening; and the measuring component is configured to measure a length of the display screen extending out of the housing;

wherein the measuring component comprises a resistor strip, a power supply, a fixed contact, and a current detecting component;

wherein the resistor strip is arranged on the display screen, and when the display screen is expanded, the resistor strip extends in a first direction, wherein the first direction is a motion direction of the display screen while the display screen is extending out of the housing, or retracting into the housing;

the fixed contact is arranged at the opening of the housing, while the display screen is extending out of the housing, or retracting into the housing, the fixed contact comes into conductive contact with the resistor strip, and is able to slide relative to the resistor strip; and the power supply, the current detecting component, the fixed contact, and the resistor strip are connected sequentially to form a loop.

\* \* \* \* \*